United States Patent
Kim et al.

(10) Patent No.: US 11,775,112 B2
(45) Date of Patent: Oct. 3, 2023

(54) TOUCH DRIVING CIRCUIT AND TOUCH DISPLAY DEVICE HAVING GROUP SENSING CONTROL SWITCH

(71) Applicant: LG Display Co., Ltd., Seoul (KR)

(72) Inventors: HyongHwan Kim, Paju-si (KR); JinBong Chung, Paju-si (KR); Sunkyung Shin, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 17/946,693

(22) Filed: Sep. 16, 2022

(65) Prior Publication Data
US 2023/0113773 A1    Apr. 13, 2023

(30) Foreign Application Priority Data

Oct. 12, 2021   (KR) .......................... 10-2021-0135229

(51) Int. Cl.
*G06F 3/041*    (2006.01)
*G06F 3/044*    (2006.01)

(52) U.S. Cl.
CPC .......... *G06F 3/04166* (2019.05); *G06F 3/044* (2013.01); *G06F 3/0412* (2013.01); *G06F 3/0443* (2019.05)

(58) Field of Classification Search
CPC .... G06F 3/04166; G06F 3/044; G06F 3/0412; G06F 3/0416; G06F 3/041661; G06F 3/0418; G06F 3/0443
See application file for complete search history.

(56) References Cited

U.S. PATENT DOCUMENTS

| | | | |
|---|---|---|---|
| 2016/0224095 A1* | 8/2016 | Jang | G06F 3/04166 |
| 2016/0239147 A1 | 8/2016 | Wang | |
| 2016/0291777 A1 | 10/2016 | Xi et al. | |
| 2016/0320886 A1* | 11/2016 | Kim | G06F 3/047 |
| 2018/0188879 A1 | 7/2018 | Lin | |
| 2019/0138150 A1* | 5/2019 | Kim | G06F 3/04164 |
| 2020/0249837 A1* | 8/2020 | Noguchi | G06F 3/0443 |
| 2021/0256238 A1* | 8/2021 | Mizuhashi | G02F 1/134336 |
| 2022/0050576 A1* | 2/2022 | Jo | G06F 3/0412 |

OTHER PUBLICATIONS

Intellectual Property Office of the United Kingdom, Combined Search and Examination Report, UK Patent Application No. 2214053.7, dated Mar. 30, 2023, six pages.

* cited by examiner

*Primary Examiner* — Darlene M Ritchie
(74) *Attorney, Agent, or Firm* — Fenwick & West LLP

(57) ABSTRACT

A touch driving circuit and a touch display device are disclosed. A group sensing control switch connected between lines connected to sensing units included in a touch driving circuit is disposed, thereby providing a structure in which one sensing unit can drive a touch electrode driven by another sensing unit. One sensing unit simultaneously drives two or more touch electrodes according to an operation state of a group sensing control switch to perform touch sensing, thereby providing a touch driving circuit and a touch display device capable of maintaining the resolution of touch sensing and improving touch sensitivity according to a driving environment.

22 Claims, 12 Drawing Sheets

TOUCH DRIVING CIRCUIT AND TOUCH DISPLAY DEVICE HAVING GROUP SENSING CONTROL SWITCH

CROSS REFERENCE TO RELATED APPLICATION

This application claims priority from Republic of Korea Patent Application No. 10-2021-0135229, filed on Oct. 12, 2021, which is hereby incorporated by reference in its entirety.

BACKGROUND

1. Field of Technology

Embodiments of the present disclosure relate to a touch driving circuit and a touch display device.

2. Description of the Prior Art

In order to provide more functions to a user, a display device may detect a touch by a user who touches a display panel and may process an input based on the detected touch.

A display device capable of detecting a touch may include, for example, a plurality of touch electrodes disposed in a display panel. A display device may sense a change in capacitance of a touch electrode when a touch is generated by a user and may detect the presence or absence of the touch of the user and touch coordinates.

In such a display device, when the sensed change in capacitance is small, touch sensitivity may be reduced, and thus the touch sensing performance of the display device may be degraded.

Accordingly, there is a need for a method capable of improving the accuracy of touch sensing of a display device to improve the touch sensitivity of the display device and to enable touch sensing in various driving environments.

SUMMARY

An aspect to the present disclosure is to provide a touch driving circuit and a touch display device capable of maintaining the resolution of touch sensing of a touch display device and improving touch sensitivity to improve the performance of touch sensing and perform touch sensing in various driving environments.

In one embodiment, a touch display device comprises: a display panel including a plurality of touch electrodes; and a touch driving circuit configured to drive the plurality of touch electrodes to sense touch of the display panel, the touch driving circuit including: a first sensing unit configured to be electrically connected to a first touch electrode of the plurality of touch electrodes, the first sensing unit configured to sense touch of at least the first touch electrode; a second sensing unit configured to be electrically connected to a second touch electrode of the plurality of touch electrodes, the second sensing unit configured to sense touch of at least the second touch electrode; a first sensing control switch configured to electrically connected between the first touch electrode and the first sensing unit; a second sensing control switch configured to electrically connected between the second touch electrode and the second sensing unit; and a first group sensing control switch having a first end electrically connected to a node between the first touch electrode and the first sensing control switch and a second end configured to be electrically connected to a node between the second touch electrode and the second sensing control switch.

In one embodiment, a touch driving circuit comprises: a first sensing unit configured to be electrically connected to a first touch electrode, the first sensing unit configured to sense touch of at least the first touch electrode; a second sensing unit configured to be electrically connected to a second touch electrode, the second sensing unit configured to sense touch of at least the second touch electrode; a first sensing control switch configured to be electrically connected between the first touch electrode and the first sensing unit; a second sensing control switch configured to be electrically connected between the second touch electrode and the second sensing unit; and a group sensing control switch having a first end electrically connected to a node between the first touch electrode and the first sensing control switch, and a second end configured to be electrically connected to a node between the second touch electrode and the second sensing control switch.

In one embodiment, a touch display device comprises: a display panel including a plurality of touch electrodes, the plurality of touch electrodes including a first touch electrode and a second touch electrode; and a touch driving circuit configured to drive the plurality of touch electrodes, the touch driving circuit including: a group sensing control switch between the first touch electrode and the second touch electrode, the group sensing control switch configured to electrically connect together the first touch electrode and the second touch electrode or electrically disconnect the first touch electrode and the second touch electrode; and a first sensing unit configured to sense touch of the display panel, wherein during a first mode of the touch display device during which the group sensing control switch is turned off, the first sensing unit is electrically connected to the first touch electrode but not the second touch electrode to sense touch of the first touch electrode, wherein during a second mode of the touch display device during which the group sensing control switch is turned on, the first sensing unit is electrically connected to the first touch electrode and the second touch electrode to sense touch of the first touch electrode and the second touch electrode.

According to embodiments of the present disclosure, group touch sensing using a touch electrode driven by another sensing unit can be performed according to the operation of a group sensing control switch disposed between sensing units, thereby providing a touch driving circuit and a touch display device capable of maintaining the resolution of touch sensing and improving touch sensitivity.

BRIEF DESCRIPTION OF THE DRAWINGS

The above and other aspects, features and advantages of the present disclosure will be more apparent from the following detailed description taken in conjunction with the accompanying drawings, in which.

DETAILED DESCRIPTION

Figure 1:
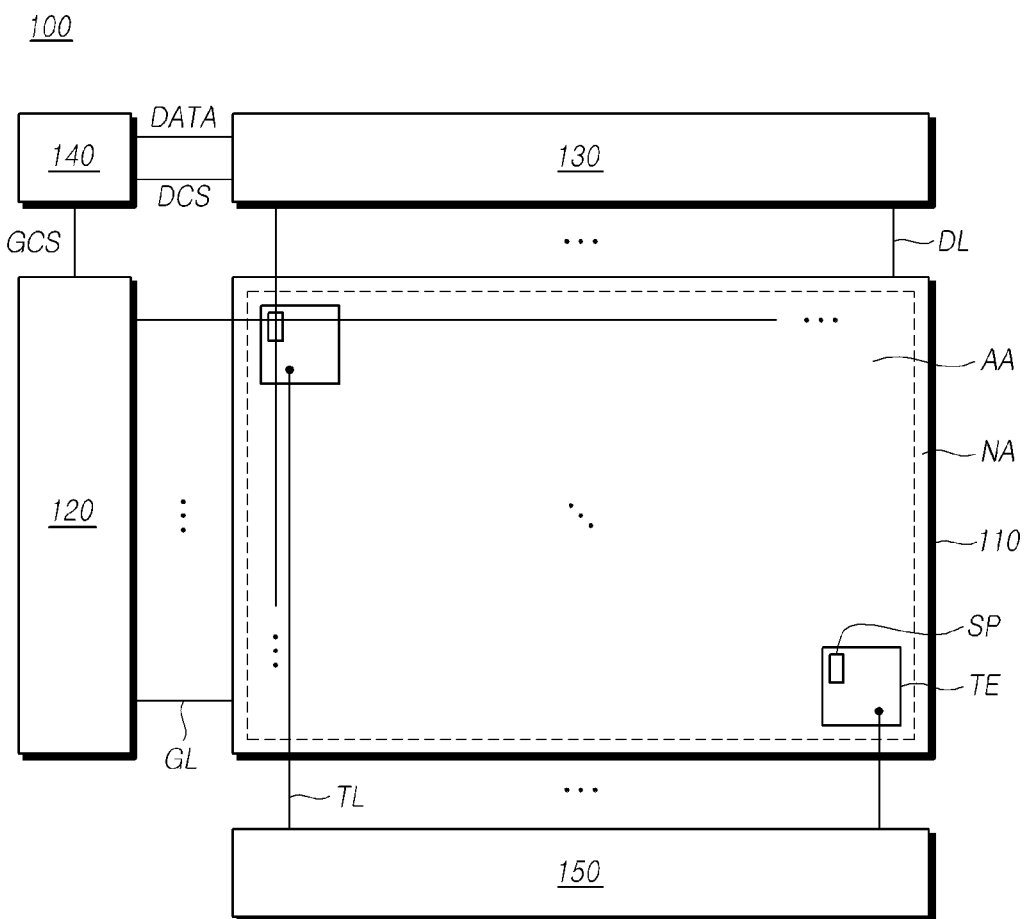
FIG. 1 is a schematic diagram illustrating a configuration of a touch display device according to one embodiment of the present disclosure.

In the following description of examples or embodiments of the present disclosure, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the present disclosure, detailed descriptions of well-known functions and components incorporated herein will be omitted when it is determined that the description may make the subject matter in some embodiments of the present disclosure rather unclear. The terms such as "including", "having", "containing", "constituting" "made up of", and "formed of" used herein are generally intended to allow other components to be added unless the terms are used with the term "only". As used herein, singular forms are intended to include plural forms unless the context clearly indicates otherwise.

Terms, such as "first", "second", "A", "B", "(A)", or "(B)" may be used herein to describe elements of the present disclosure. Each of these terms is not used to define the essence, order, sequence, or number of elements etc., but is used merely to distinguish the corresponding element from other elements.

When it is mentioned that a first element "is connected or coupled to", "contacts or overlaps" etc. a second element, it should be interpreted that, not only can the first element "be directly connected or coupled to" or "directly contact or overlap" the second element, but a third element can also be "interposed" between the first and second elements, or the first and second elements can "be connected or coupled to", "contact or overlap", etc. each other via a fourth element. Here, the second element may be included in at least one of two or more elements that "are connected or coupled to", "contact or overlap", etc. each other.

When time relative terms, such as "after," "subsequent to," "next," "before," and the like, are used to describe processes or operations of elements or configurations, or flows or steps in operating, processing, manufacturing methods, these terms may be used to describe non-consecutive or non-sequential processes or operations unless the term "directly" or "immediately" is used together.

In addition, when any dimensions, relative sizes etc. are mentioned, it should be considered that numerical values for an elements or features, or corresponding information (e.g., level, range, etc.) include a tolerance or error range that may be caused by various factors (e.g., process factors, internal or external impact, noise, etc.) even when a relevant description is not specified. Further, the term "may" fully encompasses all the meanings of the term "can".

Hereinafter, various embodiments of the present disclosure will be described in detail with reference to accompanying drawings.

FIG. 1 is a schematic diagram illustrating a configuration of a touch display device 100 according to one embodiment of the present disclosure.

Referring to FIG. 1, the touch display device 100 may include a display panel 110, a gate driving circuit 120, a data driving circuit 130, a controller 140, and the like which are for driving the display panel 110. The touch display device 100 may include a plurality of touch electrodes TE disposed in the display panel 110 to sense a touch. The touch display device 100 may include at least one touch driving circuit 150 for driving the touch electrode TE.

The display panel 110 may include an active area AA in which a plurality of subpixels SP are disposed to display an image and a non-active area NA positioned outside the active area AA. The non-active area NA does not display the image. Each of the plurality of touch electrodes TE may be disposed in an area corresponding to two or more subpixels SP.

A plurality of gate lines GL and a plurality of data lines DL may be disposed in the display panel 110, and the subpixel SP may be positioned in an area in which the gate line GL and the data line DL intersect. A plurality of touch lines TL electrically connected to the touch electrodes TE may be disposed in the display panel 110.

First, when a configuration for driving a display in the touch display device 100 is described, the gate driving circuit 120 is controlled by the controller 140 and sequentially outputs scan signals to the plurality of gate lines GL disposed in the display panel 110 to control a driving timing of the plurality of subpixels SP.

The gate driving circuit 120 may include one or more gate driver integrated circuits (GDICs) and may be positioned at only one side or both sides of the display panel 110 according to a driving method.

Each GDIC may be connected to a bonding pad of the display panel 110 in a tape automated bonding (TAB) type or a chip-on-glass (COG) type. Alternatively, each GDIC may be implemented as a gate-in-panel (GIP) type and disposed directly on the display panel 110. Alternatively, each GDIC may be integrated with and disposed on the display panel 110. Alternatively, each GDIC may be implemented as a chip-on-film (COF) type mounted on a film connected to the display panel 110.

The data driving circuit 130 receives image data from the controller 140 and converts the image data into an analog data voltage. The data driving circuit 130 allows each subpixel SP to express brightness according to image data by outputting a data voltage to the data line DL according to a timing at which a scan signal is applied through the gate line GL.

The data driving circuit 130 may include one or more source driver integrated circuits (SDICs).

Each SDIC may include a shift register, a latch circuit, a digital-to-analog converter, an output buffer, and the like.

Each SDIC may be connected to a bonding pad of the display panel 110 in a TAB type or a COG type. Alternatively, each SDIC may be disposed directly on the display panel 110. Alternatively, each SDIC may be integrated with and disposed on the display panel 110. Alternatively, each SDIC may be implemented as a COF type. In this case, each SDIC may be mounted on a film connected to the display panel 110 and may be electrically connected to the display panel 110 through lines on the film.

The controller 140 may supply various control signals to the gate driving circuit 120 and the data driving circuit 130 and may control the operations of the gate driving circuit 120 and the data driving circuit 130.

The controller 140 may be mounted on a printed circuit board, a flexible printed circuit, or the like and may be electrically connected to the gate driving circuit 120 and the data driving circuit 130 through the printed circuit board, the flexible printed circuit, or the like.

The controller 140 allows the gate driving circuit 120 to output a scan signal according to a timing set in each frame. The controller 140 converts image data input from an external device to be suitable for a data signal format used by the data driving circuit 130 and outputs the converted image data to the data driving circuit 130.

The controller 140 receives various timing signals including a vertical synchronization signal VSYNC, a horizontal synchronization signal HSYNC, an input data enable (DE) signal, and a clock signal CLK together with image data from an external device (for example, a host system).

The controller 140 may generate various control signals using the various timing signals received from the external device and may output the generated various control signals to the gate driving circuit 120 and the data driving circuit 130.

As an example, in order to control the gate driving circuit 120, the controller 140 outputs various gate control signals (GCSs) including gate start pulse (GSP), gate shift clock (GSC), and gate output enable (GOE) signals.

The GSP signal controls an operation start timing of one or more GDICs constituting the gate driving circuit 120. The GSC signal is a clock signal commonly input to one or more GDICs and controls a shift timing of a scan signal. The GOE signal specifies timing information of one or more GDICs.

In addition, in order to control the data driving circuit 130, the controller 140 outputs various data control signals (DCSs) including source start pulse (SSP), source sampling clock (SSC), and source output enable (SOE) signals.

The SSP signal controls a data sampling start timing of one or more SDICs constituting the data driving circuit 130. The SSC signal is a clock signal that controls a sampling timing of data in each SDIC. The SOE signal controls an output timing of the data driving circuit 130.

The touch display device 100 may further include a power management integrated circuit which supplies various voltages or currents to the display panel 110, the gate driving circuit 120, the data driving circuit 130, or the like or controls the various voltages or currents to be supplied.

When a configuration for touch sensing in the touch display device 100 is described, the touch driving circuit 150 may drive the plurality of touch electrodes TE disposed in the display panel 110. The touch driving circuit 150 may supply a touch driving signal to the touch electrode TE through the touch line TL and may receive a touch sensing signal from the touch electrode TE.

The touch electrode TE may be positioned outside the display panel 110 or inside the display panel 110. When the touch electrode TE is positioned inside the display panel 110, the touch electrode TE may be an electrode disposed separately from an electrode for display driving. Alternatively, the touch electrode TE may be one of the electrodes for display driving.

As an example, the touch electrode TE may be an electrode disposed by dividing a common electrode for display driving. In this case, the touch electrode TE may perform a function of an electrode for touch sensing and a function of an electrode for display driving.

As an example, the touch electrode TE may be driven as the touch electrode TE and a common electrode in periods that are temporally divided. Alternatively, the touch electrode TE may simultaneously perform a function of the touch electrode TE and a function of the common electrode. In this case, since a touch driving signal is applied to the touch electrode TE in a display driving period, a signal for display driving (for example, a data voltage or a scan signal) may be supplied in a modulated form based on the touch driving signal.

As described above, the touch driving circuit 150 may perform touch sensing by supplying a touch driving signal to the touch electrode TE in a display driving period or a period temporally divided from the display driving period. The touch driving circuit 150 may convert a touch sensing signal into digital touch sensing data and then transmit the digital touch sensing data to a touch controller. The touch controller may detect the presence or absence of a touch and touch coordinates based on the touch sensing data.

The touch driving circuit 150 may perform touch sensing by individually driving each of the plurality of touch electrodes TE through the touch line TL electrically connected to each of the plurality of touch electrodes TE.

In some cases, the touch driving circuit 150 may perform touch sensing by driving two or more touch electrodes TE through one touch line TL. In this case, since the touch driving circuit 150 performs touch sensing using a change in capacitance detected through two or more touch electrodes TE, touch sensitivity can be improved.

Figure 2A:
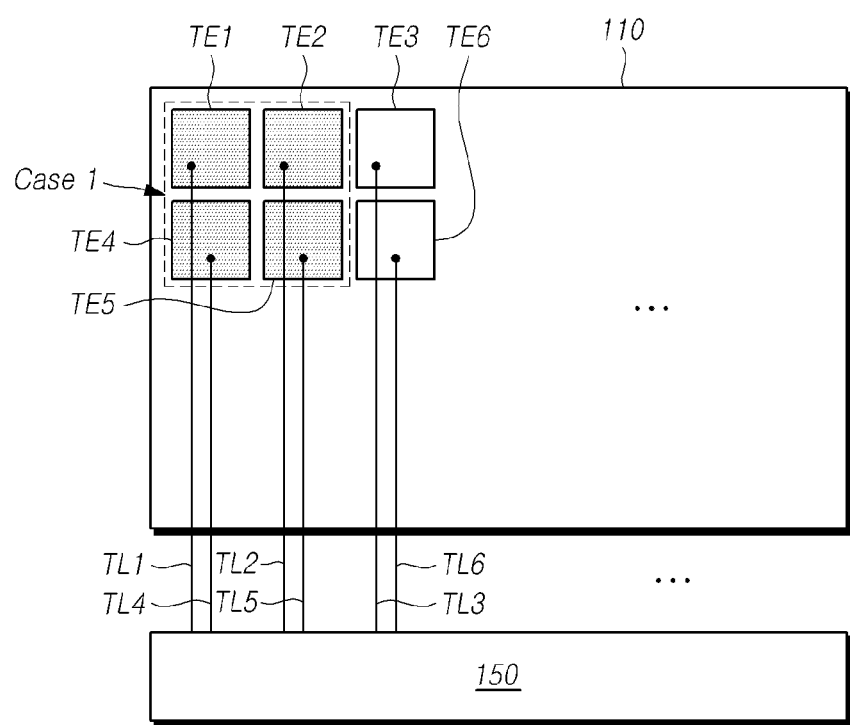
FIGS. 2A to 2C are diagrams illustrating examples of a touch sensing method of a touch display device according to embodiments of the present disclosure.
Figure 2B:
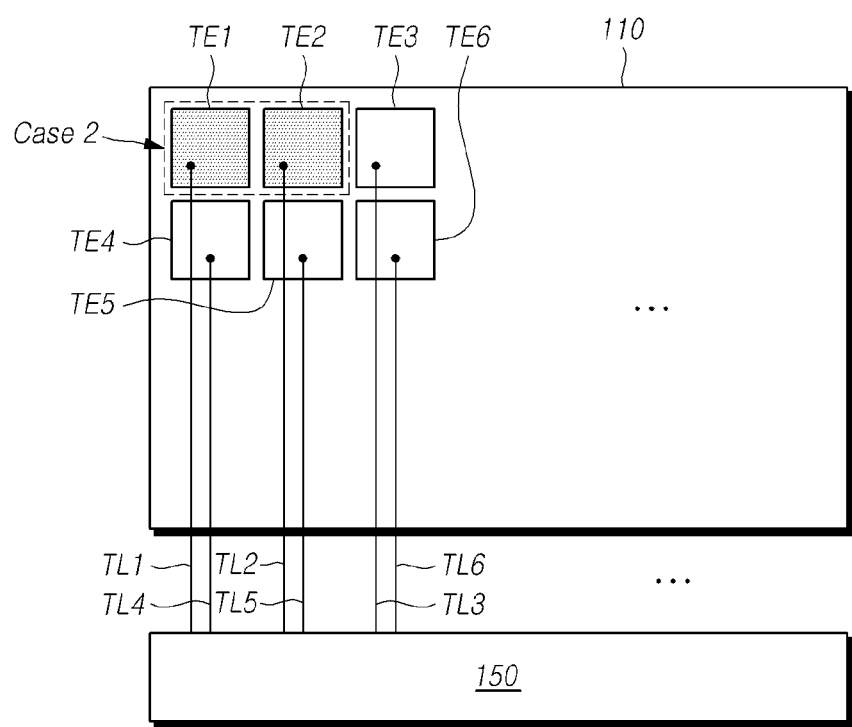
Figure 2C:
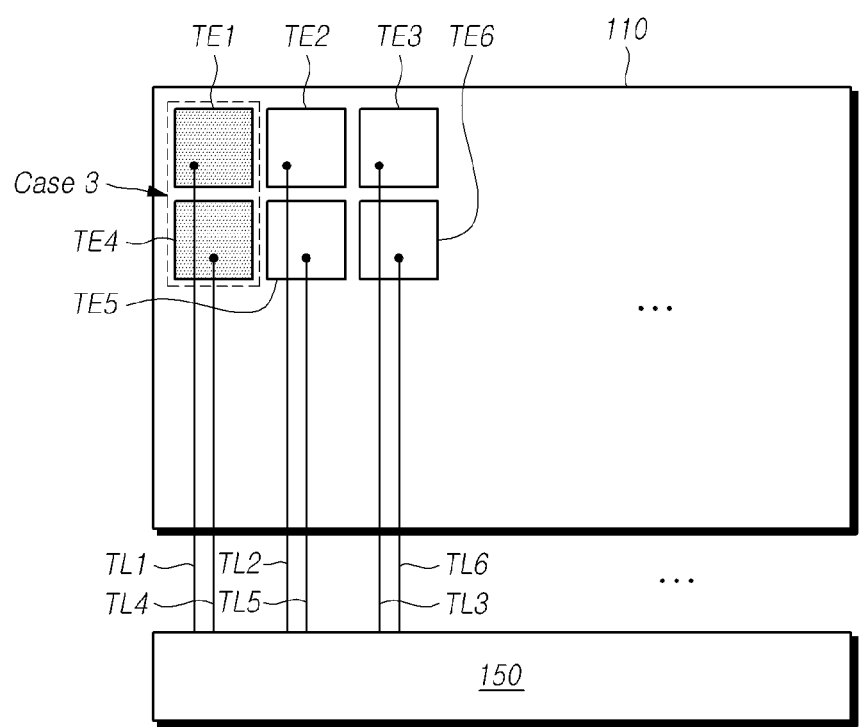

FIGS. 2A to 2C are diagrams illustrating examples of a touch sensing method of a touch display device 100 according to embodiments of the present disclosure. FIG. 3 shows diagrams illustrating examples of a timing of a touch sensing mode of the touch display device 100 according to embodiments of the present disclosure.

FIGS. 2A to 2C exemplarily show six touch electrodes TE1, TE2, TE3, TE4, TE5, and TE6 disposed adjacent to each other in a display panel 110. Each of the six touch electrodes TE1, TE2, TE3, TE4, TE5, and TE6 may be driven by one of six touch lines TL1, TL2, TL3, TL4, TL5, and TL6.

A touch driving circuit 150 may drive the touch electrodes TE disposed adjacent to each other according to a normal sensing mode (e.g., a first mode) and a group sensing mode (e.g., a second mode).

A normal sensing mode may be a mode in which each touch electrode TE is individually driven to perform touch sensing. A group sensing mode may be a mode in which one piece of touch sensing data is output based on touch sensing signals detected from two or more touch electrodes TE that form a group to perform group touch sensing.

In the present specification, touch sensing performed in a normal sensing mode may be referred to as individual touch sensing, and touch sensing performed in a group sensing mode may be referred to as group touch sensing.

As an example, referring to FIGS. 2A to 2C, in a normal sensing mode, the touch driving circuit 150 may perform individual touch sensing by individually driving one of the six touch electrodes TE1, TE2, TE3, TE4, TE5, and TE6 using each of the six touch lines TL1, TL2, TL3, TL4, TL5, and TL6.

In a group sensing mode, the touch driving circuit 150 may perform group touch sensing by processing touch sensing signals received from adjacent touch electrodes TE as one piece of touch sensing data.

The touch driving circuit 150 integrates and processes touch sensing signals detected through two or more touch lines TL inside the touch driving circuit 150, thereby driving two or more touch electrodes TE as one touch electrode TE. A size of the touch electrode TE used to generate one piece of touch sensing data may be increased.

As an example, as in Case 1 shown in FIG. 2A, in a group sensing mode, the touch driving circuit 150 may integrate and process touch sensing signals detected from a first touch electrode TE1, a second touch electrode TE2, a fourth touch electrode TE4, and a fifth touch electrode TE5 as a group, but not touch sensing signals from the third touch electrode TE3 and the sixth touch electrode TE6.

Through the group touch sensing method, it is possible to provide the same sensitivity as that of touch sensing performed by one touch electrode TE having the same size as a total size of the touch electrode TE1, the second touch electrode TE2, the fourth touch electrode TE4, and the fifth touch electrode TE5.

Alternatively, as in Case 2 shown in FIG. 2B, in a group sensing mode, the touch driving circuit 150 may integrate and process touch sensing signals detected from the first touch electrode TE1 and the second touch electrode TE2 as a group, but not touch sensing signals from the third touch electrode TE3, the fourth touch electrode TE4, the fifth touch electrode TE5, and the sixth touch electrode TE6.

Alternatively, as in Case 3 shown in FIG. 2C, in a group sensing mode, the touch driving circuit 150 may integrate and process touch sensing signals detected from the first touch electrode TE1 and the fourth touch electrode TE4 as a group, but not touch sensing signals from the second touch electrode TE2, the third touch electrode TE3, the fifth touch electrode TE5, and the sixth touch electrode TE6.

In addition to the above-described examples, in a group sensing mode, the touch driving circuit 150 may integrate and process touch sensing signals detected from two or more touch electrodes TE positioned adjacent to each other in various ways.

In addition, in some cases, the touch driving circuit 150 may perform group touch sensing by integrating and processing touch sensing signals detected from two or more touch electrodes TE positioned adjacent to each other with a touch electrode TE interposed therebetween.

Since the touch driving circuit 150 performs touch sensing by integrating and processing touch sensing signals detected from two or more touch electrodes TE, touch sensitivity can be improved in a group sensing mode.

Since the touch driving circuit 150 can be driven in a group sensing mode and a normal sensing mode, it is possible to maintain the resolution of touch sensing and to improve touch sensitivity in a period in which touch sensitivity improvement is required according to a driving environment.

As an example, when an object, which is positioned close to the display panel 110 without contacting the display panel 110, is required to be sensed (for example, a hovering touch is required), the touch driving circuit 150 can be driven in a group sensing mode to improve the touch sensitivity of a touch display device 100.

Figure 3A:
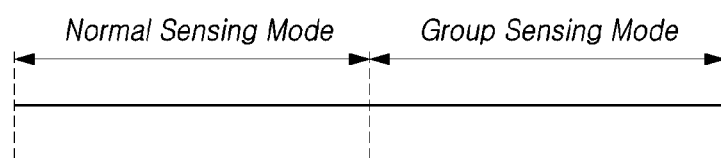
FIGS. 3A to 3C shows diagrams illustrating examples of a timing of a touch sensing mode of the touch display device according to embodiments of the present disclosure.
Figure 3B:
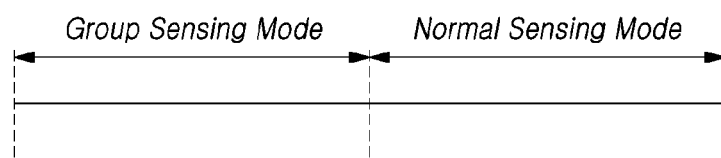
Figure 3C:
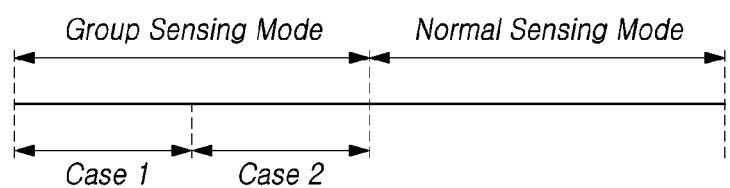

As shown in FIGS. 3A to 3C, the touch driving circuit 150 may perform touch sensing by alternating a normal sensing mode and a group sensing mode.

The normal sensing mode and the group sensing mode may be periodically alternated.

Alternatively, as in FIG. 3A, while the touch driving circuit 150 is driven in a normal sensing mode, when a touch on the display panel 110 is ended, the touch driving circuit 150 may be driven in a group sensing mode to perform a touch sensing function such as a hovering touch function on an object positioned close to the display panel 110.

Alternatively, as in FIG. 3B, while the touch driving circuit 150 is driven in a group sensing mode, when a touch on the display panel 110 is detected, the touch driving circuit 150 may be driven in a normal sensing mode to perform touch sensing by increasing the resolution of touch sensing.

Alternatively, in some cases, while the touch driving circuit 150 is driven in a group sensing mode, the touch driving circuit 150 may perform group touch sensing by varying the number of touch electrodes TE constituting a group.

As an example, as in FIG. 3C, in a group sensing mode, the touch driving circuit 150 may perform group touch sensing using four touch electrodes TE as in FIG. 2A (e.g., Case 1). As touch sensitivity increases according to touch sensing, during a group sensing mode, the touch driving circuit 150 may perform group touch sensing using two touch electrodes TE as in FIG. 2B (e.g., Case 2). Thereafter, when a touch in contact with the display panel 110 is detected, the touch driving circuit 150 may perform touch sensing in a normal sensing mode.

As described above, the touch driving circuit 150 may perform touch sensing by varying the number of touch electrodes TE used to acquire one piece of touch sensing data according to a sensing mode.

Touch sensing data is generated based on a touch sensing signal received from each touch electrode TE in a normal sensing mode, thereby maintaining a high resolution of touch sensing.

Group touch sensing is performed by increasing the number of touch electrodes TE used to generate one piece of touch sensing data in a group sensing mode, thereby providing the same effect as an effect of performing touch sensing by increasing the size of the touch electrode TE.

Accordingly, according to embodiments of the present disclosure, it is possible to maintain a high resolution of touch sensing and improve the performance of touch sensing according to a driving environment.

The above-described normal sensing mode and group sensing mode may be controlled by adjusting an electrical connection between the touch electrode TE and a sensing unit SU included in the touch driving circuit 150.

Figure 4:
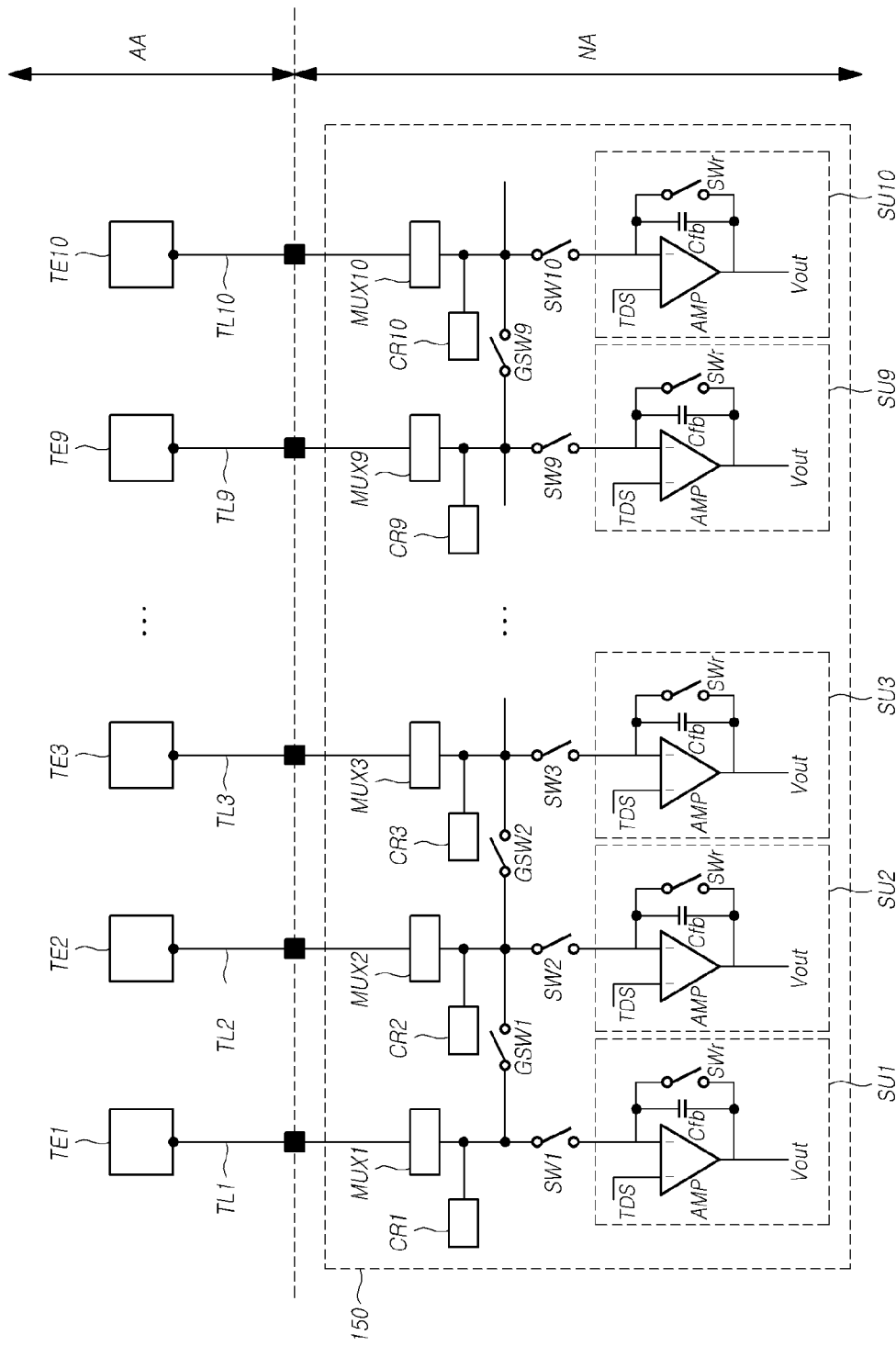
FIG. 4 is a schematic diagram illustrating a configuration of a touch display device according to one embodiment of the present disclosure.

FIG. 4 is a diagram illustrating an example of a structure of a touch driving circuit 150 according to one embodiment of the present disclosure.

Referring to FIG. 4, an example of a connection structure between touch electrodes TE disposed in an active area AA of a display panel 110 and sensing units SU (e.g., sensing circuits or sensing circuit units) included in the touch driving circuit 150 is shown.

FIG. 4 exemplarily illustrates ten touch electrodes TE1, TE2, TE3, . . . , TE9, and TE10 disposed in the active area AA. The ten touch electrodes TE1, TE2, TE3, . . . , TE9, and TE10 may be touch electrodes TE vertically or laterally disposed adjacent to each other in the active area AA. In some cases, at least one touch electrode TE may be positioned between the ten touch electrodes TE1, TE2, TE3, . . . , TE9, and TE10.

The touch driving circuit 150 may include a plurality of sensing units SU1, SU2, SU3, . . . , SU9, and SU10.

The sensing units SU may be electrically connected to the touch electrodes TE through touch lines TL.

The sensing units SU may each include, for example, an amplifier AMP, a feedback capacitor Cfb, and a reset switch SWr in one embodiment. A touch driving signal TDS may be input to a positive input terminal of the amplifier AMP. The touch driving signal TDS may be, for example, an alternating current (AC) voltage in the form of a pulse. When a touch sensing period and a display driving period are temporally divided, a common voltage may be input to the positive input terminal of the amplifier AMP during the display driving period. The common voltage may be, for example, a constant voltage. A negative input terminal of the amplifier AMP may be electrically connected to the touch electrode TE.

The touch driving signal TDS input to the positive input terminal of the amplifier AMP may be applied to the touch electrode TE. A change in capacitance of the touch electrode TE may be input to the negative input terminal of the amplifier AMP. Digital touch sensing data may be generated based on an output signal Vout of the amplifier AMP.

The touch driving circuit 150 may include a plurality of sensing control switches SW1, SW2, SW3, . . . , SW9, and SW10 electrically connected between the sensing units SU and the touch electrodes TE.

The sensing control switch SW may control an electrical connection between the sensing unit SU and a corresponding touch electrode TE. According to the operation of the sensing control switch SW, the sensing unit SU may be electrically connected to the touch electrode TE, and touch sensing using the touch electrode TE may be performed.

The touch driving circuit 150 includes a plurality of charge adjustment units CR1, CR2, CR3, . . . , CR9, and CR10 and a plurality of multiplexers MUX1, MUX2, MUX3, . . . , MUX9, and MUX10, which are electrically connected between sensing control switches SW and the touch electrodes TE. In one embodiment, a charge adjustment unit includes a switch and a capacitor in series. However, other examples of a circuit for the charge adjustment unit may be used.

The charge adjustment unit CR may adjust (e.g., reduce) an amount of capacitance detected through the touch line TL. As an example, the charge adjustment unit CR may be driven to remove parasitic capacitance formed in the touch electrode TE or the touch line TL. The charge adjustment unit CR may discharge a portion of capacitance detected through the touch line TL, thereby preventing or at least reducing a decrease in touch sensing accuracy due to parasitic capacitance during touch sensing.

The multiplexer MUX may control an electrical connection between two or more touch electrodes TE and one sensing unit SU. One sensing unit SU may sequentially drive two or more touch electrodes TE under the control of the multiplexer MUX. It is possible to reduce the number of sensing units SU required for driving the touch electrode TE.

The touch driving circuit 150 may include a plurality of group sensing control switches GSW1, GSW2, . . . , and GSW9 electrically connected to nodes between the sensing units SU and the touch electrodes TE.

Group sensing control switches GSW may be electrically connected to nodes between the sensing control switches SW and the touch electrodes TE. The group sensing control switch GSW may be electrically connected to a node between the sensing control switch SW, the multiplexer MUX, and the charge adjustment unit CR.

As an example, one end of a first group sensing control switch GSW1 may be electrically connected to a node between a first sensing control switch SW1 and a first charge adjustment unit CR1. The other end of the first group sensing control switch GSW1 may be electrically connected to a node between a second sensing control switch SW2 and a second charge adjustment unit CR2.

The group sensing control switch GSW may control an electrical connection between one sensing unit SU and the touch electrode TE driven by another sensing unit SU.

As an example, a first sensing unit SU1 and a second touch electrode TE2 may be electrically connected by the first group sensing control switch GSW1. A second sensing unit SU2 and a first touch electrode TE1 may be electrically connected by the first group sensing control switch GSW1.

One sensing unit SU may be simultaneously electrically connected to two or more touch electrodes TE by the group sensing control switch GSW to perform touch sensing. One sensing unit SU may receive touch sensing signals from two or more touch electrodes TE to perform group touch sensing.

As described above, by the operations of the sensing control switch SW and the group sensing control switch GSW included in the touch driving circuit 150, the touch driving circuit 150 may perform touch sensing according to a normal sensing mode and a group sensing mode.

Figure 5:
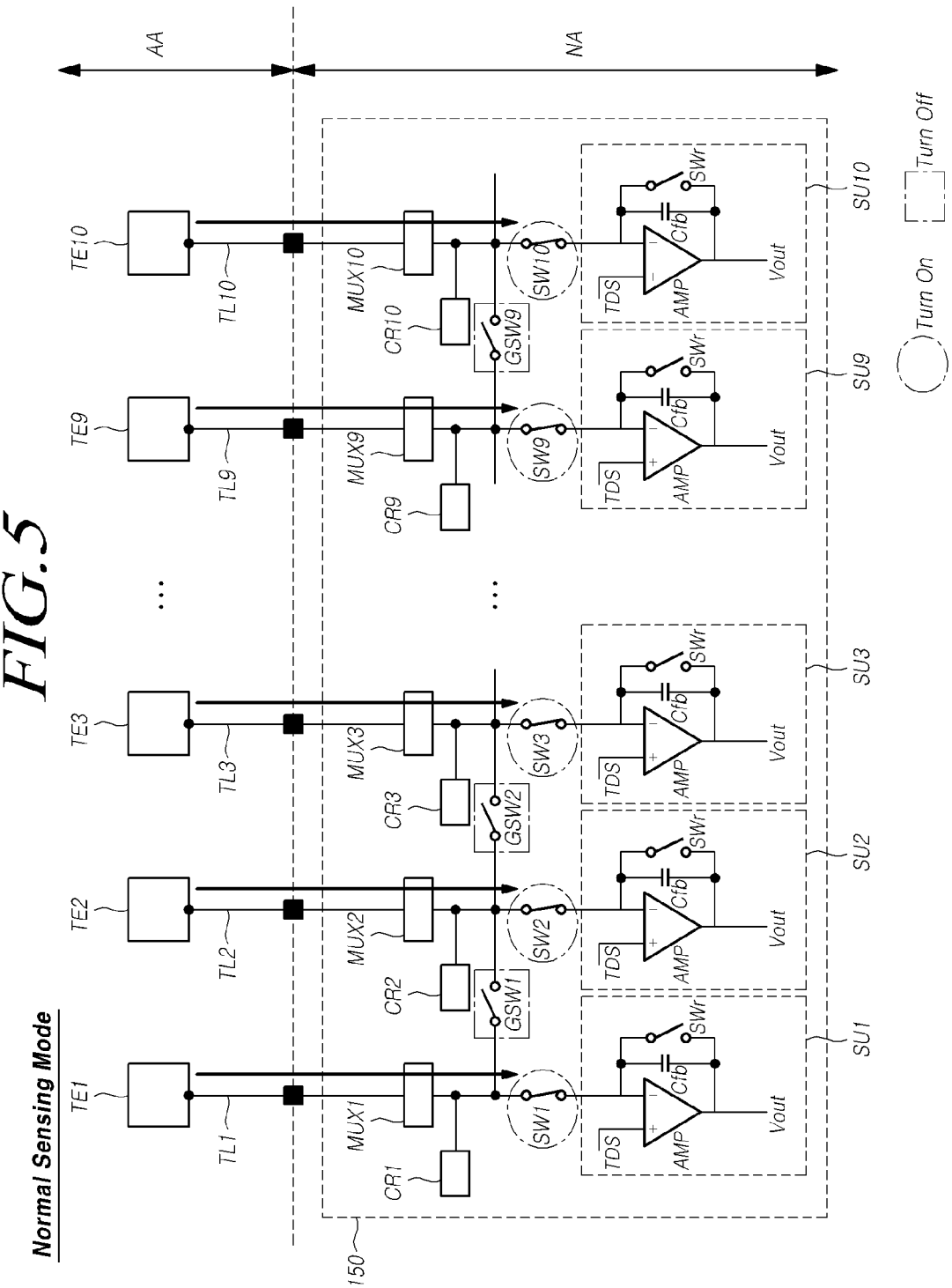
FIG. 5 is a diagram illustrating an example of a method in which the touch driving circuit operates in a normal sensing mode according to one embodiment of the present disclosure.
Figure 6:
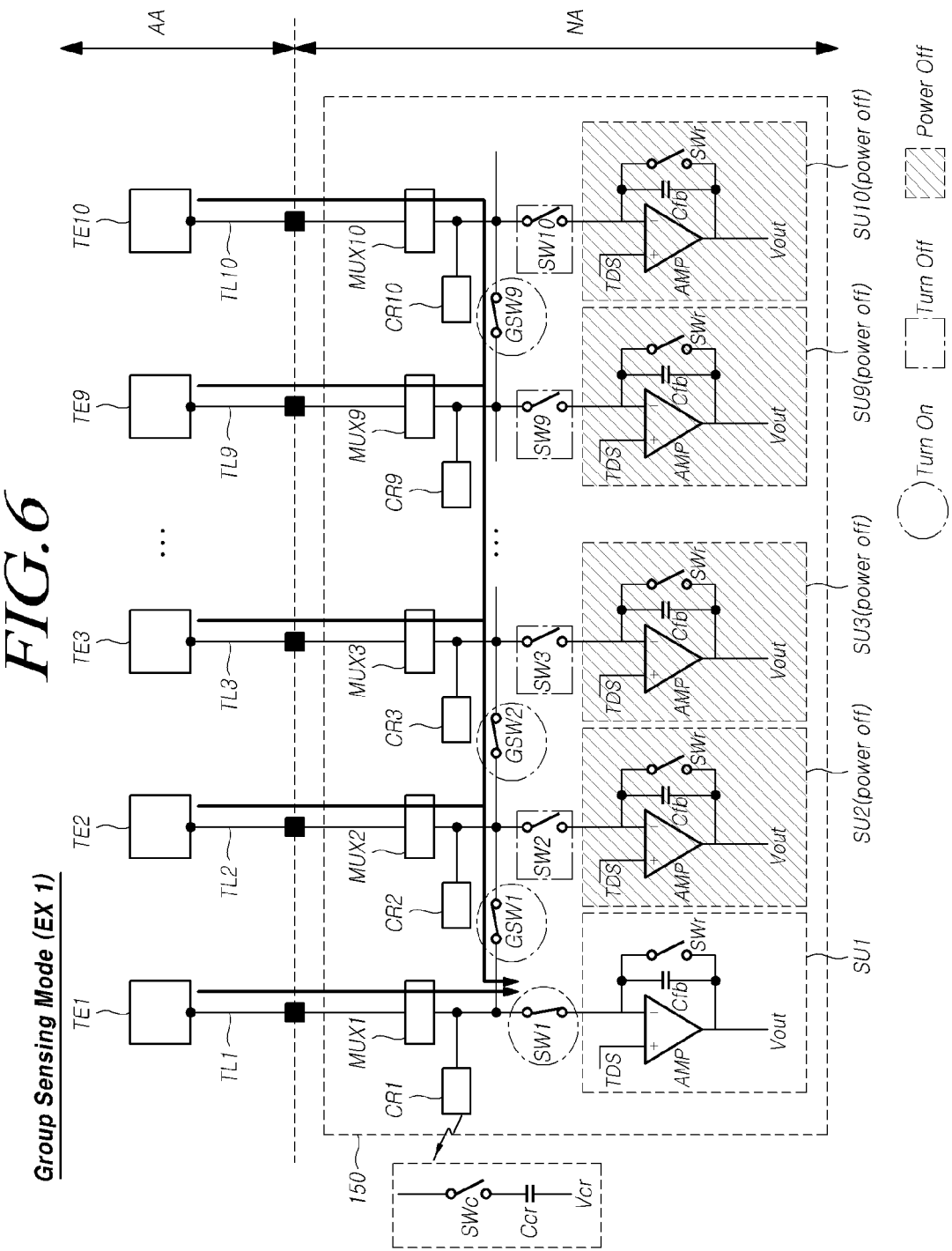
FIGS. 6 to 8 are diagrams illustrating examples of a method in which the touch driving circuit operates in a group sensing mode according to one embodiment of the present disclosure.
Figure 7:
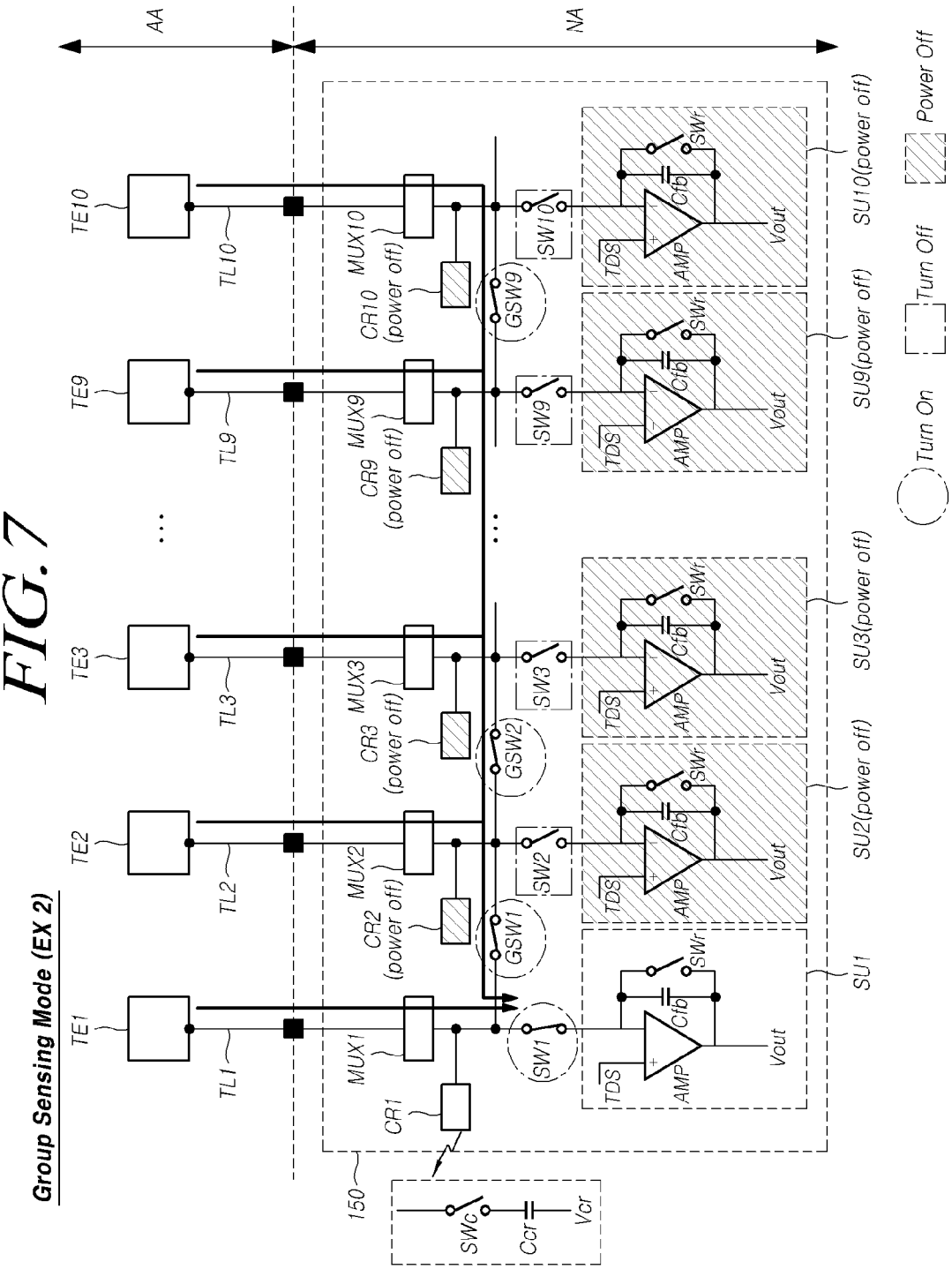
Figure 8:
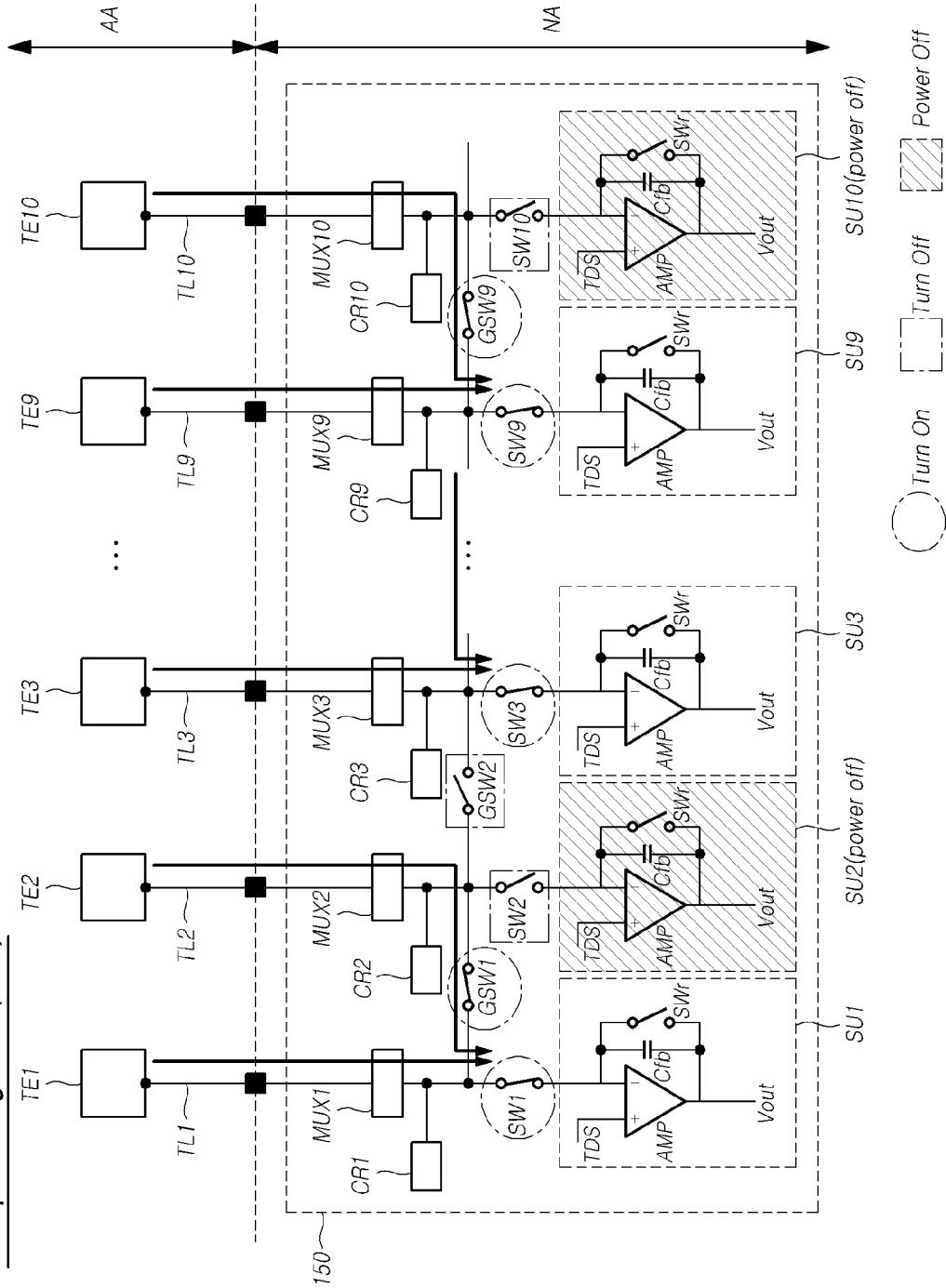

FIG. 5 is a diagram illustrating an example of a method in which the touch driving circuit 150 operates in a normal sensing mode according to embodiments of the present disclosure. FIGS. 6 to 8 are diagrams illustrating examples of a method in which the touch driving circuit 150 operates in a group sensing mode according to embodiments of the present disclosure.

Referring to FIGS. 5, in a normal sensing mode, the plurality of sensing control switches SW1, SW2, SW3, . . . , SW9, and SW10 included in the touch driving circuit 150 may simultaneously or sequentially enter a turn-on state. Since the sensing control switches SW are in a turn-on state, each of the plurality of sensing units SU1, SU2, SU3, . . . , SU9, and SU10 may be electrically connected to one of the plurality of touch electrodes TE1, TE2, TE3, . . . , TE9, and TE10.

The multiplexer MUX may control a connection between the sensing unit SU and the touch electrode TE. The charge adjustment unit CR may control an amount of charge input to the sensing unit SU by discharging charges according to parasitic capacitance formed in the touch electrode TE or the touch line TL.

In a normal sensing mode, the plurality of group sensing control switches GSW1, GSW2, . . . , and GSW9 included in the touch driving circuit 150 may be in a turn-off state.

Since the group sensing control switch GSW is in a turn-off state, the sensing unit SU may not be electrically connected to the touch electrode TE driven by another sensing unit SU.

Each sensing unit SU may perform individual touch sensing by driving the touch electrode TE electrically connected to the sensing unit SU through the multiplexer MUX. Since touch sensing data is obtained for each touch electrode TE, touch sensing can be performed at high resolution.

In a group sensing mode, at least some of the group sensing control switches GSW included in the touch driving circuit 150 may operate, and group touch sensing using two or more touch electrodes TE may be performed.

Referring to EX 1 shown in FIG. 6, in a group sensing mode, the group sensing control switches GSW connecting the touch electrodes TE constituting one group may be in a turn-on state.

FIG. 6 illustrates an example in which ten touch electrodes TE1, TE2, TE3, . . . , and TE10 constitute one group.

In a group sensing mode, the plurality of group sensing control switches GSW1, GSW2, . . . , and GSW9 may be in a turn-on state.

In a group sensing mode, any one of the plurality of sensing control switches SW1, SW2, SW3, . . . , SW9, and SW10 may be in a turn-on state. The rest of the plurality of sensing control switches SW1, SW2, SW3, . . . , SW9, and SW10 may be in a turn-off state.

In a group sensing mode, during a period in which the group sensing control switches GSW are in a turn-on state, the sensing control switch SW (e.g., SW1) electrically connected to the sensing unit SU performing group touch sensing may be in a turn-on state and the remaining sensing control switches SW (e.g., switches SW2 to SW10 are in the off state. The sensing control switch SW electrically connected to the sensing unit SU may be a switch electrically connecting the sensing unit SU and the touch line TL. In addition, the sensing control switch SW electrically connected to the sensing unit SU may be a switch that is in a turn-on state when touch sensing is performed by the sensing unit SU.

The remaining sensing control switches SW may be in a turn-off state during a period in which the group sensing control switches GSW are in a turn-on state. Since the remaining sensing control switches SW are in a turn-on state in a normal sensing mode, a period in which the remaining sensing control switches SW are in a turn-on state may not overlap a period in which the group sensing control switches GSW are in a turn-on state in a group sensing mode.

As an example, in a group sensing mode, the first sensing control switch SW1 electrically connected to the first sensing unit SU1 may be in a turn-on state. The remaining sensing control switches SW2, SW3, . . . , SW9, and SW10 excluding the first sensing control switch SW1 may be in a turn-off state.

Second to tenth sensing units SU2 to SU10 may not be electrically connected to the touch electrodes TE2, TE3, . . . , TE9, and TE10.

Ten touch electrodes TE1, TE2, TE3, . . . , TE9, and TE10 may be electrically connected to the first sensing unit SU1 by the plurality of group sensing control switches GSW1, GSW2, . . . , and GSW9 and the first sensing control switch SW1.

The first sensing unit SU1 may receive touch sensing signals from the first to tenth touch electrodes TE1 to TE10. The first sensing unit SU1 may detect a change in capacitance of the ten touch electrodes TE1, TE2, TE3, . . . , TE9, and TE10.

The first sensing unit SU1 may output an output signal Vout based on the change in capacitance detected from the ten touch electrodes TE1, TE2, TE3, . . . , TE9, and TE10.

Touch sensing data may be generated based on the output signal Vout according to the change in capacitance simultaneously detected from the ten touch electrodes TE1, TE2, TE3, . . . , TE9, and TE10. It is possible to provide touch sensitivity that is the same as or similar to that of touch sensing performed using a touch electrode TE corresponding to the sizes of the ten touch electrodes TE1, TE2, TE3, . . . , TE9, and TE10.

Accordingly, touch sensing with improved touch sensitivity can be performed in a group sensing mode, thereby improving the performance of touch sensing.

Excluding the first sensing unit SU1 that performs touch sensing in a group sensing mode, the sensing units SU2, SU3, . . . , SU9, and SU10 may be in a power-off state.

As an example, high potential power and low potential power used in the sensing unit SU may not be supplied to the second to tenth sensing units SU2 to SU10. In a group sensing mode in which sensing is performed by the first sensing unit SU1, the amplifier AMP included in each of the second to tenth sensing units SU2 to SU10 is allowed to be in a power-off state, thereby reducing current consumption. Thus, group sensing mode saves more power than the normal sensing mode.

In addition, in a group sensing mode, some of the plurality of charge adjustment units CR1, CR2, CR3, . . . , CR9, and CR10 may be in a power-off state.

Referring first to EX 1 shown in FIG. 6, the charge adjustment unit CR may be electrically connected to a path between the group sensing control switch GSW and the touch electrode TE.

The charge adjustment unit CR may include, for example, a charge adjustment switch SWc and a charge adjustment capacitor Ccr. Charge adjustment power Vcr may be supplied to the charge adjustment unit CR.

Since the charge adjustment unit CR is connected to the path between the touch electrode TE and the group sensing control switch GSW, in a group sensing mode, parasitic capacitance may be removed by the charge adjustment unit CR connected to each touch electrode TE.

Alternatively, as in EX 2 shown in FIG. 7, in a group sensing mode, the first charge adjustment unit CR1 electrically connected to the first sensing unit SU1 performing group touch sensing may be in a power-on state.

Second to tenth charge adjustment units CR2 to CR10 may be in a power-off state.

The power-off state of the charge adjustment unit CR may be a state in which the charge adjustment power Vcr is not supplied to the charge adjustment unit CR. In addition, the power-off state of the charge adjustment unit CR may be a state in which all power required for operating the charge adjustment unit CR is not supplied to the charge adjustment unit CR.

The capacitance of the charge adjustment capacitor Ccr included in the charge adjustment unit CR may be sufficient to remove parasitic capacitance detected through the plurality of touch lines TL. In this case, excluding the charge adjustment unit CR electrically connected to the sensing unit SU performing group touch sensing in a group sensing mode, the charge adjustment units CR are allowed to be in a power-off state, thereby reducing current consumption in the group sensing mode In addition, in a structure including the plurality of group sensing control switches GSW1, GSW2, . . . , and GSW9, the touch driving circuit 150 may perform group touch sensing in various ways according to operation states of the group sensing control switch GSW and the sensing control switch SW.

Referring to EX 3 shown in FIG. 8, in a group sensing mode, some sensing control switches SW may be in a turn-on state. As an example, in a group sensing mode, the first sensing control switch SW1, a third sensing control switch SW3, . . . , and a ninth sensing control switch SW9 may be in a turn-on state. A second sensing control switch SW2, . . . , and a tenth sensing control switch SW10 may be in a turn-off state.

The first group sensing control switch GSW1 connected between the first sensing unit SU1 and the second sensing unit SU2 may be in a turn-on state.

Group touch sensing using the first touch electrode TE1 and the second touch electrode TE2 may be performed by the first sensing unit SU1. Similarly, group touch sensing using the ninth touch electrode TE9 and the tenth touch electrode TE10 may be performed by the ninth sensing unit SU9.

Group touch sensing using two touch electrodes TE may be performed by some sensing units SU.

Group touch sensing using various numbers of touch electrodes TE may be performed through control of the sensing control switch SW connected to each sensing unit SU and the group sensing control switch GSW connected between the sensing units SU.

In a group sensing mode as in EX 3, the second sensing unit SU2, ..., and the tenth sensing unit SU10 which do not perform group touch sensing may be in a power-off state. In addition, in some cases, the second charge adjustment unit CR2, ..., and the tenth charge adjustment unit CR10 electrically connected to the second sensing unit SU2, ..., and the tenth sensing unit SU10 may be in a power-off state.

In a group sensing mode, the sensing unit SU not performing group touch sensing and the charge adjustment unit CR connected thereto may be controlled to be in a power-off state, thereby reducing current consumption for driving the touch driving circuit 150 when the group touch sensing is performed.

As described above, the touch driving circuit 150 may perform group touch sensing in various ways based on a change in capacitance detected from two or more touch electrodes TE, thereby improving touch sensitivity in a group sensing mode.

When the normal sensing mode shown in FIG. 5 is compared with EX 1 of the group sensing mode shown in FIG. 6 as an example, the output signal Vout output by the sensing unit SU in the normal sensing mode may be calculated as in Equation 1 below.

$$V_{out} = TDS + \Delta TDS \times (1 \pm (Cp + C_{finger})/C_{fb}) - (\Delta V_{cr} \times C_{cr}/C_{fb})$$ [Equation 1]

Here, Cp denotes parasitic capacitance. Cfinger denotes the charge caused by a touched finger. The output signal Vout may be output based on a value obtained by subtracting an amount of charge, which is removed by the charge adjustment unit CR, from an amount of change in capacitance caused by a touch.

The output signal Vout output by the sensing unit SU performing group touch sensing using two or more touch electrodes TE in the group sensing mode may be calculated as in Equation 2 below.

$$V_{out} = TDS + \Delta TDS \times (1 + ((Cp1 + Cp2 + \ldots + Cp10) + (C_{finger1} + C_{finger2} + \ldots + C_{finger10}))/C_{fb1}) - (\Delta V_{cr} \times (C_{cr1} + C_{cr2} + \ldots + C_{cr10})/C_{fb1})$$ [Equation 2]

Since touch sensing signals are received from the plurality of touch electrodes TE, parasitic capacitance may be increased but may be removed by the charge adjustment unit CR.

Since Cfinger1+Cfinger2+ ... +Cfinger10, that is, an amount of change in capacitance caused by a touch of a user, is greater than the amount of change in capacitance obtained in the normal sensing mode, touch sensitivity can be improved in the group sensing mode.

Accordingly, according to embodiments of the present disclosure, the structure of the touch electrodes TE is maintained, and the number of touch electrodes TE used for touch sensing is varied, thereby improving touch sensitivity according to a driving environment of the touch display device 100 to improve the performance of touch sensing.

The touch driving circuit 150 driven in a normal sensing mode and a group sensing mode may include an area in which the group sensing control switches GSW are disposed according to the number or type of group sensing control switches GSW required for driving in the group sensing mode.

Figure 9:
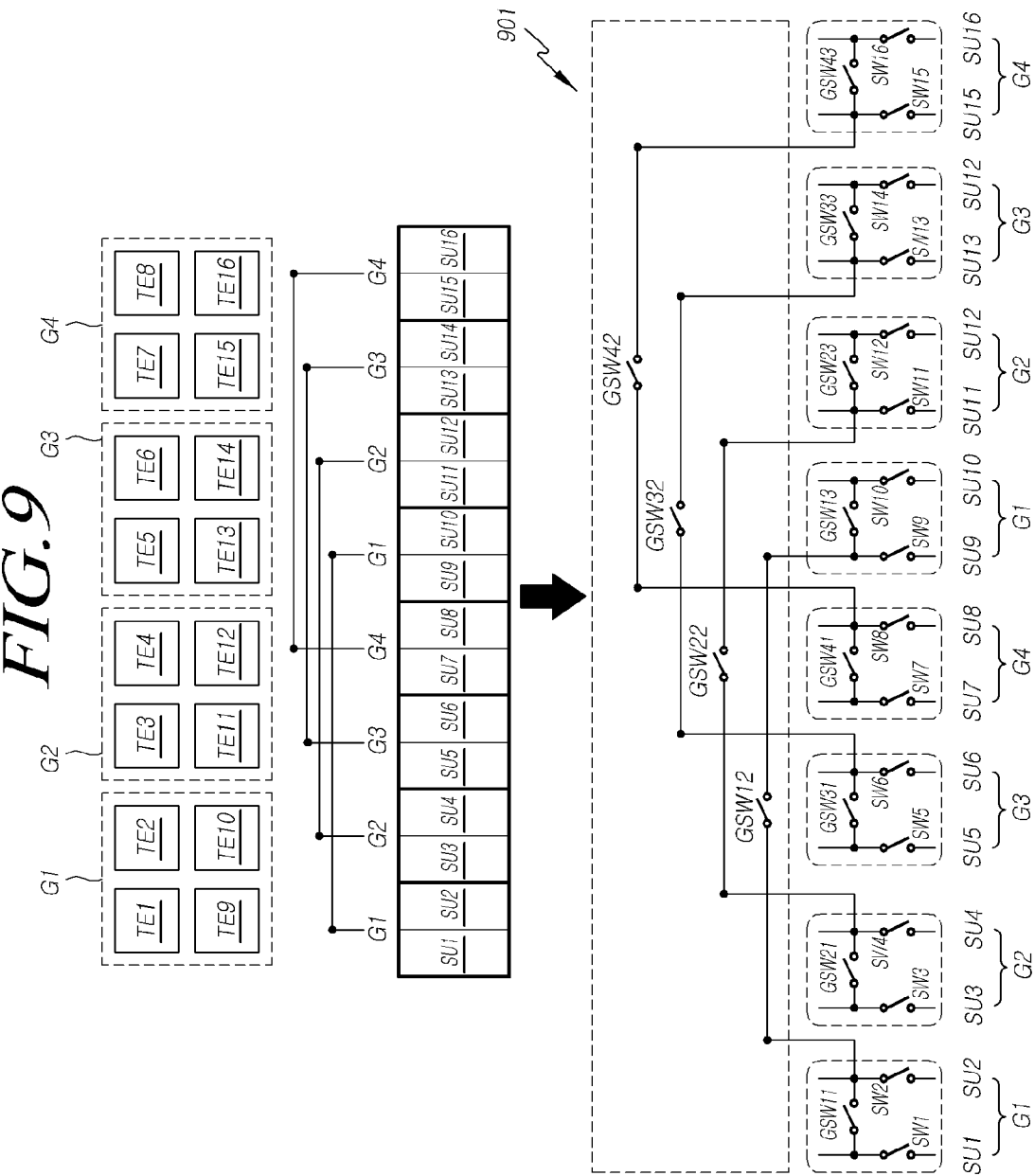
FIGS. 9 and 10 shows diagrams illustrating an example of a structure in which sensing units are disposed in a touch driving circuit according to one embodiment of the present disclosure.
Figure 10:
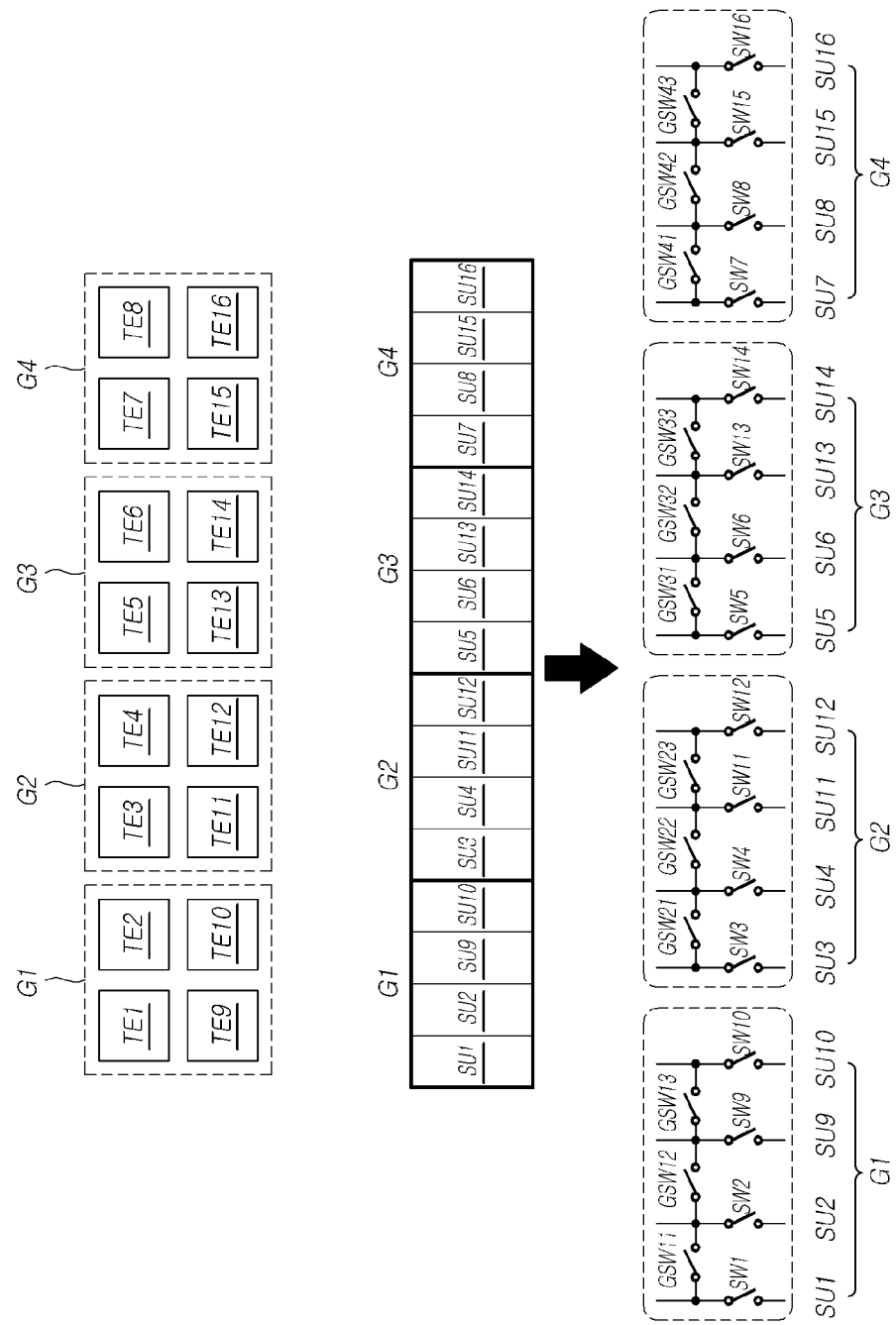

FIGS. 9 and 10 shows diagrams illustrating an example of a structure in which sensing units SU are disposed in a touch driving circuit 150 according to embodiments of the present disclosure.

Referring to FIG. 9, an example in which four touch electrodes TE disposed adjacent to each other constitute one group is shown. As an example, a first touch electrode TE1, a second touch electrode TE2, a ninth touch electrode TE9, and a tenth touch electrode TE10 may constitute a first group G1. Similarly, four adjacent touch electrodes TE may constitute a second group G2, a third group G3, or a fourth group G4.

A group sensing control switch GSW may be disposed between lines connected to sensing units SU which are electrically connected to the touch electrodes TE constituting the same group and drive the corresponding touch electrodes TE.

As an example, a first group sensing control switch GSW11 of the first group G1 may be disposed between lines connected to a first sensing unit SU1 driving the first touch electrode TE1 and a second sensing unit SU2 driving the second touch electrode TE2, wherein the first touch electrode TE1 and the second touch electrode TE2 constitute the first group G1.

A third group sensing control switch GSW13 of the first group G1 may be disposed between lines connected to a ninth sensing unit SU9 driving the ninth touch electrode TE9 and a tenth sensing unit SU10 driving the tenth touch electrode TE10, wherein the ninth touch electrode TE9 and the tenth touch electrode TE10 constitute the first group G1.

A second group sensing control switch GSW12 of the first group G1, which is connected between lines connected to a second sensing unit SU2 driving the second touch electrode TE2 and a ninth sensing unit SU9 driving the ninth touch electrode TE9, wherein the second touch electrode TE2 and the ninth touch electrode TE9 constitute the first group G1, may be disposed in a separate area indicated by 901. The area indicated by 901 may be, for example, an area between an area in which the sensing control switch SW connected to the sensing unit SU and some group sensing control switches GSW are disposed inside the touch driving circuit 150 and a point at which a touch line TL is connected to the touch driving circuit 150. In addition, the area indicated by 901 may be an area between the area in which the sensing control switch SW connected to the sensing unit SU and some group sensing control switches GSW are disposed and an area in which other circuit elements (for example, a charge adjustment unit CR and a multiplexer MUX are disposed inside the touch driving circuit 150. Among the group sensing control switches GSW11, GSW12, and GSW13 of the first group G1, the first group sensing control switch GSW11 and the third group sensing control switch GSW13 may be positioned between the adjacent sensing units SU, and thus a separate area may not be added or the addition thereof may be minimized to arrange the first group sensing control switch GSW11 and the third group sensing control switch GSW13. The second group sensing control switch GSW12 of the first group G1 is disposed in an area added between the first and third group sensing control switches GSW11 and GSW13 of the first group G1 and the point at which the touch line TL is connected to the touch driving circuit 150, and thus group touch sensing using the touch electrodes TE driven by the sensing units SU not adjacent to each other may be enabled.

Similarly, a second group sensing control switch GSW22 of the second group G2, a second group sensing control switch GSW32 of the third group G3, and a second group sensing control switch GSW42 of the fourth group G4 may be disposed in the area indicated by 901.

Since an area in which some group sensing control switches GSW are disposed is positioned inside the touch driving circuit 150, group touch sensing using the touch electrodes TE driven by the sensing units SU not adjacent to each other may be performed.

Alternatively, in order to efficiently arrange the group sensing control switches GSW in the touch driving circuit 150, the sensing units SU which drive the touch electrodes TE constituting the same group may be positioned adjacent to each other.

Referring to FIG. 10, as in the example shown in FIG. 9, four touch electrodes TE positioned adjacent to each other may constitute one group in a group sensing mode.

A first group G1 may include, for example, a first touch electrode TE1, a second touch electrode TE2, a ninth touch electrode TE9, and a tenth touch electrode TE10. A first sensing unit SU1, a second sensing unit SU2, a ninth sensing unit SU9, and a tenth sensing unit SU10 driving the touch electrodes TE1, TE2, TE9, and TE10 included in the first group G1 may be disposed adjacent to each other inside the touch driving circuit 150.

Since the sensing units SU1, SU2, SU9, and SU10 driving the touch electrodes TE1, TE2, TE9, and TE10 constituting the first group G1 are positioned adjacent to each other, a separate area for arranging group sensing control switches GSW11, GSW12, and GSW13 of the first group G1 for controlling group touch sensing of the first group G1 may not be required.

Since an additional area for arranging group sensing control switches GSW for group touch sensing is not required, a touch driving circuit 150 capable of being driven in a normal sensing mode and a group sensing mode can be easily implemented.

Alternatively, in the structure shown in FIG. 10, the group sensing control switch GSW is disposed in an additional area such as the area indicated by 901 shown in FIG. 9, thereby implementing a structure in which the number of touch electrodes TE included in one group is varied to enable group touch sensing.

As an example, the group sensing control switch GSW connected between lines connected to the first sensing unit SU1 of the first group G1 and the ninth sensing unit SU9 may be further disposed. In addition, the group sensing control switch GSW connected between lines connected to the second sensing unit SU2 of the first group G1 and the tenth sensing unit SU10 may be further disposed.

In this case, according to an operation state of the group sensing control switches GSW connected to the four sensing units SU1, SU2, SU9, and SU10 controlling the first group G1, among four touch electrodes TE1, TE2, TE9, and TE10 constituting the first group G1, group touch sensing using four touch electrodes TE1, TE2, TE9, and TE10 or group touch sensing using two touch electrodes TE1 and E2, TE9 and TE10, TE1 and TE9, or TE2 and TE10 may be performed.

In a structure in which the sensing units SU for driving the touch electrodes TE constituting the same group are disposed adjacent to each other, by adding an area in which the group sensing control switch GSW is disposed, the number of touch electrodes TE constituting a group may be varied according to touch sensitivity or a touch sensing state in a group sensing mode to perform group touch sensing.

The above-described embodiments of the present disclosure will be briefly described below.

A touch display device 100 according to embodiments of the present disclosure may include a plurality of touch electrodes TE disposed in a display panel 110, and a touch driving circuit 150 configured to drive the plurality of touch electrodes TE.

The touch driving circuit 150 may include a first sensing unit SU1 electrically connected to a first touch electrode TE1, a second sensing unit SU2 electrically connected to a second touch electrode TE2, a first sensing control switch SW1 electrically connected between the first touch electrode TE1 and the first sensing unit SU1, a second sensing control switch SW2 electrically connected between the second touch electrode TE2 and the second sensing unit SU2, and a first group sensing control switch GSW1 having one end electrically connected to a node between the first touch electrode TE1 and the first sensing control switch SW1 and the other end electrically connected to a node between the second touch electrode TE2 and the second sensing control switch SW2.

During at least a partial period of a first sensing period, at least one of the first sensing control switch SW1 and the second sensing control switch SW2 may be in a turn-on state, and during the first sensing period, the first group sensing control switch GSW1 may maintain a turn-off state.

During at least a partial period of a second sensing period, the first group sensing control switch GSW1 may be in a turn-on state, and during a period in which the first group sensing control switch GSW1 is in the turn-on state, any one of the first sensing control switch SW1 and the second sensing control switch SW2 may be in a turn-on state, and the other thereof may be in a turn-off state.

During the period in which the first group sensing control switch GSW1 is in the turn-on state, any one of the first sensing unit SU1 and the second sensing unit SU2 may be in a power-on state, and the other thereof may be in a power-off state.

The touch driving circuit 150 may further include a first multiplexer MUX1 electrically connected between the first touch electrode TE1 and the first sensing control switch SW1, and a second multiplexer MUX2 electrically connected between the second touch electrode TE2 and the second sensing control switch SW2.

On end of the first group sensing control switch GSW1 may be electrically connected to a node between the first multiplexer MUX1 and the first sensing control switch SW1, and the other end of the first group sensing control switch GSW1 may be electrically connected to a node between the second multiplexer MUX2 and the second sensing control switch SW2.

The touch driving circuit 150 may further include a first charge adjustment unit CR1 electrically connected between the first multiplexer MUX1 and the first sensing control switch SW1, and a second charge adjustment unit CR2 electrically connected between the second multiplexer MUX2 and the second sensing control switch SW2.

One end of the first group sensing control switch GSW1 may be electrically connected to a node between the first charge adjustment unit CR1 and the first sensing control switch SW1, and the other end of the first group sensing control switch GSW1 may be electrically connected to a node between the second charge adjustment unit CR2 and the second sensing control switch SW2.

During a period in which the first group sensing control switch GSW1 is in a turn-on state, any one of the first charge adjustment unit CR1 and the second charge adjustment unit CR2 may be in a power-on state, and the other thereof may be in a power-off state.

The touch driving circuit 150 may further include a third sensing unit SU3 electrically connected to a third touch electrode TE3, a third sensing control switch SW3 electrically connected between the third touch electrode TE3 and the third sensing unit SU3, and a second group sensing control switch GSW2 having one end electrically connected to a node between the second touch electrode TE2 and the second sensing control switch SW2 and the other end electrically connected to a node between the third touch electrode TE3 and the third sensing control switch SW3.

During a period in which the first group sensing control switch GSW1 is in a turn-on state, the second group sensing control switch GSW2 may be in a turn-on state.

During a period in which the first group sensing control switch GSW1 and the second group sensing control switch GSW2 are in the turn-on state, any one of the first sensing control switch SW1, the second sensing control switch SW2, and the third sensing control switch SW3 may be in a turn-on state, and the rest may be in a turn-off state.

During a period in which the first group sensing control switch GSW1 and the second group sensing control switch GSW2 are in the turn-on state, any one of the first sensing unit SU1, the second sensing unit SU2, and the third sensing unit SU3 may be in a power-on state, and the rest may be in a power-off state.

The second group sensing control switch GSW2 may be in a turn-on state during a partial period of a period in which the first group sensing control switch GSW1 is in a turn-on state and may be in a turn-off state during another period of the period.

A period in which both of the first group sensing control switch GSW1 and the second group sensing control switch GSW2 are in a turn-on state and a period in which only the first group sensing control switch GSW1 is in a turn-on state may be consecutive sensing periods.

The third sensing unit SU3 may be disposed adjacent to the second sensing unit SU2.

Alternatively, the third touch electrode TE3 may be positioned adjacent to the second touch electrode TE2, and at least one sensing unit SU may be disposed between the third sensing unit SU3 and the second sensing unit SU2.

According to the above-described embodiments of the present disclosure, it is possible to provide a structure in which a group sensing control switch GSW connected between lines connected to sensing units SU may be disposed inside a touch driving circuit 150 so that any one sensing unit SU may drive a touch electrode TE driven by another sensing unit SU.

According to an operation state of the group sensing control switch GSW, any one sensing unit SU may simultaneously drive two or more touch electrodes TE to perform group touch sensing.

By improving touch sensitivity through group touch sensing, it is possible to improve the performance of touch sensing in various driving environments.

In addition, according to an operation state of the group sensing control switch GSW, a touch driving circuit 150 may be driven in a normal sensing mode. Accordingly, it is possible to provide a touch display device 100 capable of maintaining the resolution of the touch sensing and performing touch sensing by varying a size of a touch electrode TE according to a touch sensing mode.

The above description has been presented to enable any person skilled in the art to make and use the technical idea of the present disclosure, and has been provided in the context of a particular application and its requirements. Various modifications, additions and substitutions to the described embodiments will be readily apparent to those skilled in the art, and the general principles defined herein may be applied to other embodiments and applications without departing from the spirit and scope of the present disclosure. The above description and the accompanying drawings provide an example of the technical idea of the present disclosure for illustrative purposes only. That is, the disclosed embodiments are intended to illustrate the scope of the technical idea of the present disclosure. Thus, the scope of the present disclosure is not limited to the embodiments shown, but is to be accorded the widest scope consistent with the claims. The scope of protection of the present disclosure should be construed based on the following claims, and all technical ideas within the scope of equivalents thereof should be construed as being included within the scope of the present disclosure.

What is claimed is:

1. A touch display device comprising:
 a display panel including a plurality of touch electrodes; and
 a touch driving circuit configured to drive the plurality of touch electrodes to sense touch of the display panel, the touch driving circuit including:
  a first sensing unit configured to be electrically connected to a first touch electrode of the plurality of touch electrodes, the first sensing unit configured to sense touch of at least the first touch electrode;
  a second sensing unit configured to be electrically connected to a second touch electrode of the plurality of touch electrodes, the second sensing unit configured to sense touch of at least the second touch electrode;
  a first sensing control switch configured to electrically connect the first touch electrode and the first sensing unit;
  a second sensing control switch configured to electrically connect the second touch electrode and the second sensing unit; and
  a first group sensing control switch having a first end electrically connected to a node between the first touch electrode and the first sensing control switch and a second end configured to be electrically connected to a node between the second touch electrode and the second sensing control switch,
 wherein during at least a partial period of a first sensing period, at least one of the first sensing control switch and the second sensing control switch is in a turn-on state to connect together at least one of the first touch electrode and the first sensing unit, and the second touch electrode and the second sensing unit; and
 during the first sensing period, the first group sensing control switch maintains a turn-off state to disconnect the first sensing unit from the second touch electrode and to disconnect the second sensing unit from the first touch electrode,
 wherein during at least a partial period of a second sensing period, the first group sensing control switch is in a turn-on state and
 while the first group sensing control switch is in the turn-on state, either the first sensing control switch is in the turn-on state to connect the first sensing unit to the first touch electrode and the second touch electrode and the second sensing control switch is in the turn-off state, or the second sensing control switch is in the turn-on state to connect the second sensing unit to the first touch electrode and the second touch electrode and the first sensing control switch is in the turn-off state.

2. The touch display device of claim 1, wherein, during the period in which the first group sensing control switch is in the turn-on state, the first sensing unit is in a power-on state and the second sensing unit is in a power-off state, or the first sensing unit is in the power-off state and the second sensing unit is in the power-on state.

3. The touch display device of claim 1, wherein:
the touch driving circuit further comprises a first multiplexer electrically connected between the first touch electrode and the first sensing control switch, and a second multiplexer electrically connected between the second touch electrode and the second sensing control switch; and
the first end of the first group sensing control switch is electrically connected to a node between the first multiplexer and the first sensing control switch, and the second end of the first group sensing control switch is electrically connected to a node between the second multiplexer and the second sensing control switch.

4. The touch display device of claim 3, wherein:
the touch driving circuit further comprises a first charge adjustment unit electrically connected between the first multiplexer and the first sensing control switch and configured to reduce parasitic capacitance of the first touch electrode, and a second charge adjustment unit electrically connected between the second multiplexer and the second sensing control switch and configured to reduce parasitic capacitance of the second touch electrode; and
the first end of the first group sensing control switch is electrically connected to a node between the first charge adjustment unit and the first sensing control switch, and the second end of the first group sensing control switch is electrically connected to a node between the second charge adjustment unit and the second sensing control switch.

5. The touch display device of claim 4, wherein, during a period in which the first group sensing control switch is in a turn-on state, either the first charge adjustment unit is in a power-on state and the second charge adjustment unit is in a power-off state, or the first charge adjustment unit is in the power-off state and the second charge adjustment unit is in the power-on state.

6. The touch display device of claim 4, wherein at least one of the first charge adjustment unit and the second charge adjustment unit includes a switch and a capacitor in series.

7. The touch display device of claim 1, wherein the touch driving circuit further comprises:
a third sensing unit configured to be electrically connected to a third touch electrode of the plurality of touch electrodes;
a third sensing control switch configured to be electrically connected between the third touch electrode and the third sensing unit; and
a second group sensing control switch having a first end electrically connected to a node between the second touch electrode and the second sensing control switch, and a second end configured to be electrically connected to a node between the third touch electrode and the third sensing control switch.

8. The touch display device of claim 7, wherein, during a period in which the first group sensing control switch is in a turn-on state, the second group sensing control switch is in a turn-on state.

9. The touch display device of claim 8, wherein, during the period in which the first group sensing control switch and the second group sensing control switch are in the turn-on state, one of the first sensing control switch, the second sensing control switch, and the third sensing control switch is in a turn-on state, and remaining sensing control switches of the first sensing control switch, the second sensing control switch, and the third sensing control switch are in a turn-off state.

10. The touch display device of claim 8, wherein, during the period in which the first group sensing control switch and the second group sensing control switch are in the turn-on state, one of the first sensing unit, the second sensing unit, and the third sensing unit is in a power-on state, and remaining sensing units of the first sensing unit, the second sensing unit, and the third sensing unit are in a power-off state.

11. The touch display device of claim 7, wherein the second group sensing control switch is in a turn-on state during a first portion of a period in which the first group sensing control switch is in the turn-on state, and the second group sensing control switch is a turn-off state during a second portion of the period.

12. The touch display device of claim 11, wherein a period in which both of the first group sensing control switch and the second group sensing control switch are in the turn-on state and a period in which the first group sensing control switch is in the turn-on state and the second group sensing control switch is in the turn-off state are consecutive sensing periods.

13. The touch display device of claim 7, wherein the third sensing unit is disposed adjacent to the second sensing unit.

14. The touch display device of claim 7, wherein:
the third touch electrode is positioned adjacent to the second touch electrode; and
at least one sensing unit is disposed between the third sensing unit and the second sensing unit.

15. A touch driving circuit comprising:
a first sensing unit configured to be electrically connected to a first touch electrode, the first sensing unit configured to sense touch of at least the first touch electrode;
a second sensing unit configured to be electrically connected to a second touch electrode, the second sensing unit configured to sense touch of at least the second touch electrode;
a first sensing control switch configured to be electrically connected between the first touch electrode and the first sensing unit;
a second sensing control switch configured to be electrically connected between the second touch electrode and the second sensing unit;
a group sensing control switch having a first end electrically connected to a node between the first touch electrode and the first sensing control switch, and a second end configured to be electrically connected to a node between the second touch electrode and the second sensing control switch;
a first multiplexer electrically connected to the first touch electrode;
a first charge adjustment unit electrically connected between the first multiplexer and the first sensing control switch, the first charge adjustment unit configured to reduce parasitic capacitance of the first touch electrode;
a second multiplexer electrically connected to the second touch electrode; and
a second charge adjustment unit electrically connected between the second multiplexer and the second sensing control switch, the second charge adjustment unit configured to reduce parasitic capacitance of the second touch electrode, wherein the group sensing control switch has the first end electrically connected to a node between the first charge adjustment unit and the first sensing control switch, and the second end electrically connected to a node between the second charge adjustment unit and the second sensing control switch.

16. The touch driving circuit of claim 15, wherein the group sensing control switch and the first sensing control switch are simultaneously in a turn-on state and the second sensing control switch is in a turn-off state, or the group sensing control switch and the second sensing control switch are simultaneously in the turn-on state and the first sensing control switch is in the turn-off state according to a sensing mode.

17. The touch driving circuit of claim 15, wherein a period in which all of the first sensing control switch and the second sensing control switch is in a turn-on state is non-overlapping with a period in which the group sensing control switch is in the turn-on state.

18. A touch display device comprising:
   a display panel including a plurality of touch electrodes, the plurality of touch electrodes including a first touch electrode and a second touch electrode; and
   a touch driving circuit configured to drive the plurality of touch electrodes, the touch driving circuit including:
      a group sensing control switch between the first touch electrode and the second touch electrode, the group sensing control switch configured to electrically connect together the first touch electrode and the second touch electrode or electrically disconnect the first touch electrode and the second touch electrode; and
      a first sensing unit configured to sense touch of the display panel,
   wherein during a first mode of the touch display device during which the group sensing control switch is turned off, the first sensing unit is electrically connected to the first touch electrode but not the second touch electrode to sense touch of the first touch electrode,
   wherein during a second mode of the touch display device during which the group sensing control switch is turned on, the first sensing unit is electrically connected to the first touch electrode and the second touch electrode to sense touch of the first touch electrode and the second touch electrode.

19. The touch display device of claim 18, wherein the touch driving circuit further includes:
   a second sensing unit configured to sense touch of the display panel;
   a first sensing control switch between the first touch electrode and the first sensing unit, the first sensing control switch configured to electrically connect together the first touch electrode and the first sensing unit or electrically disconnect the first touch electrode and the first sensing unit; and
   a second sensing control switch between the second touch electrode and the second sensing unit, the second sensing control switch configured to electrically connect together the second touch electrode and the second sensing unit or electrically disconnect the second touch electrode and the second sensing unit.

20. The touch display device of claim 19, wherein during the first mode the first sensing control switch is turned on to electrically connect the first sensing unit to the first touch electrode, and the second sensing control switch is turned on to electrically connect the second sensing unit to the second touch electrode, and during the second mode the first sensing control switch is turned on to electrically connect the first sensing unit to the first touch electrode and the second touch electrode, and the second sensing control switch is turned off to electrically disconnect the second sensing unit from the second touch electrode.

21. The touch display device of claim 19, wherein the first mode consumes more power than the second mode.

22. The touch display device of claim 18, wherein the first sensing unit includes:
   an amplifier having a first input that receives a touch driving signal and a second input that is electrically connected to the first touch electrode via a first sensing control switch; and
   a capacitor and a switch connected in parallel to the second input and an output of the amplifier.

* * * * *